US012739148B2

(12) United States Patent
Pires et al.

(10) Patent No.: US 12,739,148 B2
(45) Date of Patent: Sep. 15, 2026

(54) METHOD FOR COMMUNICATING MESSAGES BETWEEN A PLURALITY OF PIECES OF USER EQUIPMENT

(71) Applicant: BULL SAS, Les Clayes-sous-Bois (FR)

(72) Inventors: Alexis Pires, Colomiers (FR); Mathieu Badet, Toulouse (FR); Sylvain Bremec, Seysse (FR); Arnaud Sire De Vilar, Avignonet Lauragais (FR)

(73) Assignee: BULL SAS, Les Clayes-sous-Bois (FR)

( * ) Notice: Subject to any disclaimer, the term of this patent is extended or adjusted under 35 U.S.C. 154(b) by 430 days.

(21) Appl. No.: 18/420,663

(22) Filed: Jan. 23, 2024

(65) Prior Publication Data

US 2024/0259226 A1 Aug. 1, 2024

(30) Foreign Application Priority Data

Jan. 27, 2023 (EP) .................................... 23305110

(51) Int. Cl.
*H04L 12/18* (2006.01)

(52) U.S. Cl.
CPC ........ *H04L 12/1872* (2013.01); *H04L 12/189* (2013.01)

(58) Field of Classification Search
CPC ... H04L 12/1872; H04L 12/189; H04L 1/189; H04L 1/1809
See application file for complete search history.

(56) References Cited

U.S. PATENT DOCUMENTS

2004/0148396 A1* 7/2004 Meyer .................. H04L 1/1809 709/227
2004/0221043 A1 11/2004 Su et al.
2010/0272104 A1* 10/2010 Li ........................ H04L 1/1825 370/390
2012/0201248 A1* 8/2012 Aoki .................... H04L 1/1809 370/394
2013/0230040 A1 9/2013 Adachi et al.
2021/0297128 A1* 9/2021 Badic .................. H04B 7/0617
2021/0297199 A1* 9/2021 Miao .................... H04L 1/1819
2022/0303056 A1* 9/2022 Miyazaki ............. H04L 1/1896
2022/0393796 A1* 12/2022 Baghel ................. H04L 1/1864
2024/0259767 A1* 8/2024 Pires .................... H04L 1/1858
2024/0340932 A1* 10/2024 Stefanatos ........... H04L 1/1887

OTHER PUBLICATIONS

Search Report issued in EP23305110.1 dated Jun. 21, 2023 (12 pages).

* cited by examiner

*Primary Examiner* — Jeong S Park
(74) *Attorney, Agent, or Firm* — ARC IP Law, PC; Joseph J. Mayo

(57) ABSTRACT

The invention relates to a method for communicating messages between a plurality of pieces of user equipment of a set of user equipment via a communication network. The method includes, when a transmitter determines that a last payload message of a series received by a receiver, for which all payload messages preceding it in the series have also been received, is different from the last payload message of the series, rebroadcasting by the sender of the payload messages of the series following the last payload message received by the receiver.

12 Claims, 2 Drawing Sheets

METHOD FOR COMMUNICATING MESSAGES BETWEEN A PLURALITY OF PIECES OF USER EQUIPMENT

This application claims priority to European Patent Application Number 23305110.1, filed 27 Jan. 2023, the specification of which is hereby incorporated herein by reference.

BACKGROUND OF THE INVENTION

Technical Field of the Invention

At least one embodiment of the invention relates to the field of tactical telecommunications and relates more particularly to a method for communicating messages between a plurality of pieces of user equipment via a communication network.

Description of the Related Art

Wireless telecommunication networks of the tactical radio network type are networks that have several restrictions. Firstly, to perform the discovery of services, it is necessary for each network user equipment to be able to identify the other pieces of equipment present in order to communicate with them. Next, these types of networks, both mobile and decentralized, involve packet losses, which can pose reliability issues. Finally, operation in point-to-point, so-called "unicast", mode may not be supported by some pieces of tactical radio telecommunication user equipment, which is a drawback.

Known solutions may be impossible to implement or have unsatisfactory exchange reliability.

For example, the transmission control protocol or UDP (User Datagram Protocol) has no retransmission mechanism, which consists in ensuring that each packet is received and retransmitting any unreceived packets, and is therefore not sufficiently reliable. UDP also limits packet size to 64 KB, which may be too small in high-speed radio communication networks.

The reliable transmission control protocol or RUDP (Reliable User Datagram Protocol) implements retransmission mechanisms but can generate a lot of packet traffic because it uses a mechanism for systematically acknowledging receipt of data packets, which can significantly degrade the network's useful bandwidth. In addition, this protocol only operates in point-to-point mode.

The transport layer protocol, or QUIC (Quick UDP Internet Protocol), only operates in point-to-point (unicast) mode in its initial version, and can therefore be complex or even impossible to implement in an ad hoc wireless network. Next, QUIC can generate a large number of acknowledgements and therefore packet exchanges on the network, which can significantly degrade the network's usable bandwidth.

The transmission control protocol (TCP) also only operates in point-to-point mode (unicast) and also uses a mechanism for systematically acknowledging receipt of data packets, which can significantly degrade the network's usable bandwidth.

There is therefore a need for a simple and effective solution to overcome at least some of these drawbacks.

BRIEF SUMMARY OF THE INVENTION

One of the aims of at least one embodiment of the invention is to enable simple, reliable and efficient data exchange within highly constrained networks such as tactical radio networks.

To this end, at least one embodiment of the invention is firstly a method for communicating messages between a plurality of pieces of user equipment of a user equipment set via a communication network, especially a wireless, preferably highly constrained ad hoc communication network, said method comprising the steps of:

- broadcasting by each user equipment of the user equipment set a status message indicating the presence of said user equipment on the communication network,
- broadcasting by one, so-called "transmitter", of the pieces of user equipment of the user equipment set a series of payload messages to at least one other piece of user equipment of the user equipment set, each payload message of said series of payload messages comprising an identifier of said payload message and the identifier of the preceding payload message of the series, the messages of the series being ordered (and preferably transmitted) in the order of their identifiers which thus form an identifier string, which may for example be consecutive,
- receiving by the other pieces of so-called "receiver" user equipment, at least one payload message of the series of payload messages broadcast by the transmitter,
- determining, by each receiver, from the at least one payload message received, its status of recipient or not of the series of payload messages broadcast,
- for each receiver having determined a status of recipient of the series of payload messages broadcast, constructing, by said receiver, the identifier string of at least a part of the series of payload messages received (of consecutive identifiers) from their identifiers of payload message and the identifiers of preceding payload message contained in each message received,
- inserting, by each receiver, into its next status message to be broadcast, the last identifier of the identifier string constructed by said receiver, known as the "last identifier",
- receiving by the transmitter the last identifier received from each receiver,
- determining the last weakest identifier among the last identifiers received from the receivers,
- when the transmitter of the series determines that the last weakest identifier determined is different from the identifier of the last payload message of the series, rebroadcasting by said transmitter the payload message(s) of the series having an identifier following the last weakest identifier determined in the identifier string.

Thus, in one or more embodiments, the transmitter collects the status message sent by each receiver, compares the last string identifiers, keeps the weakest (therefore that of the receiver that has received the fewest messages) and rebroadcasts (to all receivers) the messages not received by this worst receiver. There is therefore only one rebroadcast for all the receivers.

The method according to at least one embodiment of the invention enables both data exchanges, in particular within highly constrained networks, such as highly constrained ad hoc networks, while ensuring high reliability (low packet loss) and avoiding significant bandwidth degradation, thus limiting data loss. By the terms "presence of user equipment on the communication network", it is meant that the user equipment is connected to the network so as to be able to receive messages sent by the other pieces of user equipment of the user equipment set. Indeed, a user device may be connected to the network without being able to receive messages, for example because it is too far from the other pieces of user equipment.

Advantageously, by way of one or more embodiments, each payload message of the series of payload messages comprises the identifier of one or more recipients.

Still advantageously, by way of one or more embodiments, the size of a payload set configured to be inserted into a payload message being greater than the maximum size of the payload field of said payload message, the method comprises a step of segmenting the payload set in order to distribute said payload into a series of payload messages whose identifiers are ranked in ascending order so as to allow a receiver to fully reconstruct said series of payload messages. Thus, large messages are segmented in order to respect the restrictions of the link layer.

Preferably, in at least one embodiment, the identifiers of the consecutive payload messages of a series are consecutive.

One or more embodiments of the invention also relates to a computer program product wherein a set of program code instructions which, when run by one or more processors, configure the processor(s) to implement a method as set forth previously.

At least one embodiment of the invention also relates to transmitter user equipment for communicating messages between a plurality of pieces of user equipment of a user equipment set via a communication network, said transmitter user equipment being configured to:

broadcast a series of payload messages to at least one other piece of receiver user equipment of the user equipment set, each payload message of said series of payload messages comprising an identifier of said payload message and the identifier of the preceding payload message of the series, the messages of the series being ordered in the order of their identifiers which thus form an identifier string, receive a last identifier sent by each receiver, determine the last weakest identifier among the last identifiers received from the other pieces of user equipment, when the user equipment determines that the last weakest identifier determined is different from the identifier of the last payload message of the series, rebroadcast the payload message(s) of the series having an identifier following the last weakest identifier determined in the identifier string.

Preferably, in at least one embodiment, the transmitter user equipment is configured to broadcast a status message indicating the presence on the communication network of said user equipment.

Still preferably, in at least one embodiment, the user equipment is configured to insert the identifier of one or more recipients into each payload message of the series of payload messages.

Still preferably, in at least one embodiment, the transmitter user equipment is configured to, the size of a payload set configured to be inserted into a payload message being greater than the maximum size of the payload field of said payload message, segment the payload set in order to distribute said payload into a series of payload messages whose identifiers are ranked in ascending order in order to allow a receiver to fully reconstruct said series of payload messages.

In at least one embodiment, the transmitter user equipment is configured to insert consecutive identifiers into the consecutive messages of a same series, for example in increments of 1.

At least one embodiment of the invention also relates to receiver user equipment for communicating messages between a plurality of pieces of user equipment of a user equipment set via a communication network, said receiver user equipment being configured to:

receive at least one payload message of a series of payload messages broadcast by a piece of transmitter user equipment of the user equipment set, determine, from a payload message received, its status of recipient or not of a series of payload messages broadcast, when said receiver user equipment has determined a status of recipient of the series of payload messages sent, construct the identifier string of at least a part of the series of payload messages of consecutive identifiers received from their identifiers of payload message and identifiers of preceding payload message contained in each payload message received, insert into its next status message to be broadcast the identifier of the last payload message received.

At least one embodiment of the invention also relates to user equipment being both a transmitter, as set forth previously, and a receiver, as set forth above.

Preferably, in at least one embodiment, the user equipment is configured to broadcast a status message indicating the presence of said user equipment on the communication network.

At least one embodiment of the invention also relates to a communication system comprising a plurality of pieces of user equipment as set forth previously and a communication network, preferably a tactical radio or ad hoc wireless or MANET network, configured to enable communication between said pieces of user equipment.

BRIEF DESCRIPTION OF THE DRAWINGS

Further characteristics and advantages of the one or more embodiments of the invention will further appear upon reading the description that follows. This is purely illustrative and should be read in conjunction with the appended drawings in which.

DETAILED DESCRIPTION OF THE INVENTION

Figure 1:
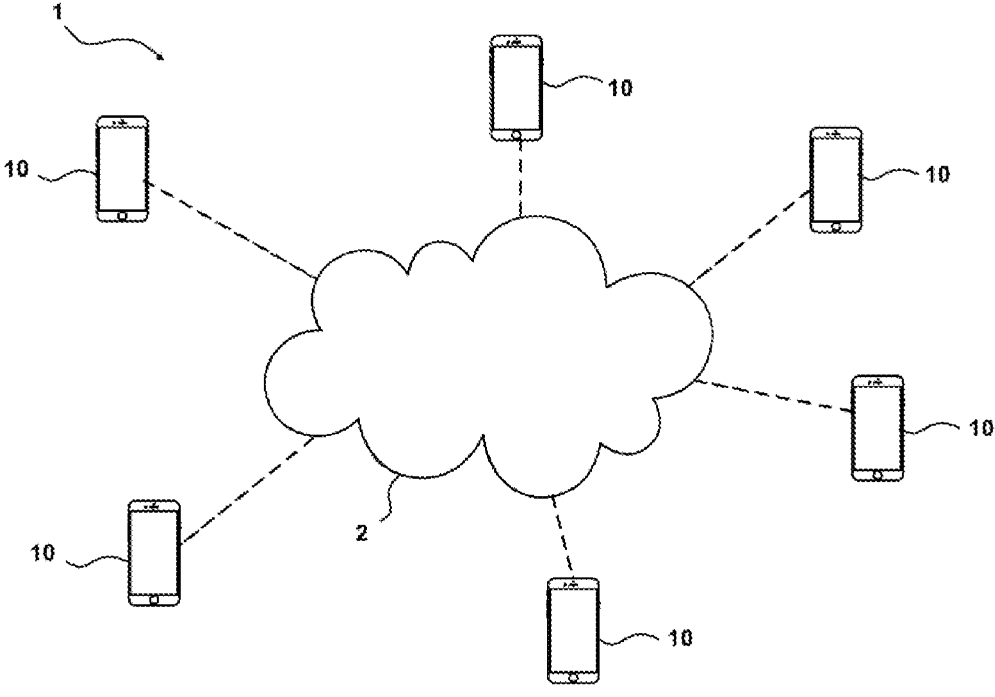
FIG. 1 schematically illustrates a system according to one or more embodiments of the invention.

FIG. 1 illustrates an example of system 1 according to one or more embodiments of the invention.

System 1

The system 1 comprises a user equipment 10 set and a communication network 20.

User Equipment 10

Each user equipment 10, by way of one or more embodiments, is configured to operate in both transmission and reception (that is, can operate as a transmitter and/or receiver). Each user equipment 10 includes a unique identifier in the system 1.

Each user equipment 10, by way of one or more embodiments, is configured to transmit two types of messages: so-called "status" messages and so-called "payload" messages. Each message comprises data which are coded in a signal transmitted by the transmitter user equipment 10, in a manner known per se. Thus, in at least one embodiment, each user equipment 10 is configured to code the data to be sent in a signal and to send said signal to the pieces of receiver user equipment 10 via the communication network 20. Similarly, in at least one embodiment, each receiver user equipment 10 is configured to receive the signals transmitted by the other pieces of user equipment 10 and to decode said signals in order to determine the messages coded in said signals. It should be noted that a user equipment being a transmitter (broadcaster) of a series of payload messages in a first sequence may be a receiver of a series of payload messages in a second sequence, and vice versa.

In at least one embodiment, the payload messages are sent as a series of messages. A series of messages comprises at least one payload message. Each payload message of the series comprises an identifier of said message, payload intended for one or more of the other pieces of user equipment 10 of the user equipment 10 set, for example, data of an application (or application data), and the identifier(s) of the pieces of user equipment 10 recipients of the series of payload messages. Each payload message also comprises the identifier of the payload message preceding it in the series, when possible, that is, from the second message in the series.

Each user equipment 10 is configured to broadcast a series of payload messages whenever such payload is to be sent to one, several, or even all the pieces of user equipment 10 of the user equipment 10 set. The messages are broadcast to all the pieces of user equipment 10 but may have only one or some of them as recipients.

To this end, by way of one or more embodiments, each user equipment 10 is configured to insert into each payload message of the series, an identifier of said message, the identifier(s) of the recipient user equipment 10 and, from the second message of the series, the identifier of the message immediately preceding it in the series. For example, in at least one embodiment, for a series of three messages whose identifiers are 001, 010 and 011, the first message comprises the identifier 001, the addresses of the recipient(s) and its payload, the second message comprises the identifier 010, the identifier 001, the addresses of the recipient(s) and its payload, and the third message comprises the identifier 011, the identifier 010, the addresses of the recipient(s) and its payload.

A status message comprises the identifier of the user equipment 10 that emits the status message in order to allow the other pieces of user equipment 10 to know that said user equipment 10 transmitter of the status message is present on the communication network 20 in order to receive messages. A status message shall comprise, where applicable and for each network participant, the identifier of the last payload message received for which all the payload messages preceding it in the series have also been received. Each user equipment 10 is configured to broadcast, that is periodically transmit, a status message when said user equipment 10 is present on the communication network 20.

Each user equipment 10 is configured to determine, from at least one payload message received, whether said user equipment 10 is a recipient or not of the series of messages broadcast.

Each user equipment 10 recipient of a series of payload messages is configured to construct the identifier string of at least a part of the series of payload messages of consecutive identifiers received from their identifiers of message and the identifiers of preceding message contained in each payload message received. For example, in at least one embodiment, for a series of four messages whose identifiers are 001, 010, 011 and 100, if the user equipment 10 recipient of the series has received the first, second and fourth messages of the series, the identifier string constructed will be 001-010 since the identifier 100 of the fourth message is not consecutive to the identifier 010 of the second message in the identifier string.

Each user equipment 10 recipient of a series of payload messages participating in the network is configured to insert into its next status message MS to be transmitted, the last identifier of the identifier string constructed. In the example of the previous paragraph, by way of one or more embodiments, the last identifier inserted by the user equipment 10 into its next status message MS is therefore that of the second message 010.

A transmitter user equipment 10 is configured to receive the last identifier sent by each receiver user equipment 10, by way of one or more embodiments.

A transmitter user equipment 10 is configured to determine the last weakest identifier among the last identifiers received from the receiver user equipment 10 by way of one or more embodiments.

When a transmitter user equipment 10 has determined that the last weakest determined identifier is different from the identifier of the last payload message M1, . . . , Mn of the series S, said transmitter user equipment 10 is configured to rebroadcast the payload message(s) M1, . . . , Mn of the series S having an identifier following, in the identifier string, the last weakest identifier determined. In other words, in one or more embodiments, when the transmitter detects that a receiver is not up to date with the messages sent, it rebroadcasts the missing payload messages. Thus, in at least one embodiment, the transmitter collects the status message sent by each receiver, compares the last string identifiers, keeps the weakest (therefore that of the receiver that has received the fewest messages) and rebroadcasts (to all receivers) the messages not received by this worst receiver. There is therefore only one rebroadcast for all the receivers.

If one piece of recipient user equipment 10 has not received any payload message M1, . . . , Mn from the series S, then its status message MS contains no identifier. In this case, by way of one or more embodiments, the transmitter user equipment 10 considers that the last identifier is null and rebroadcasts all the payload messages M1, . . . , Mn of the series S or possibly the last N payload messages of the series S, N being predefined.

Each user equipment 10 comprises a processor capable of implementing a set of instructions enabling these functions to be performed.

Example of Implementation

Figure 2:
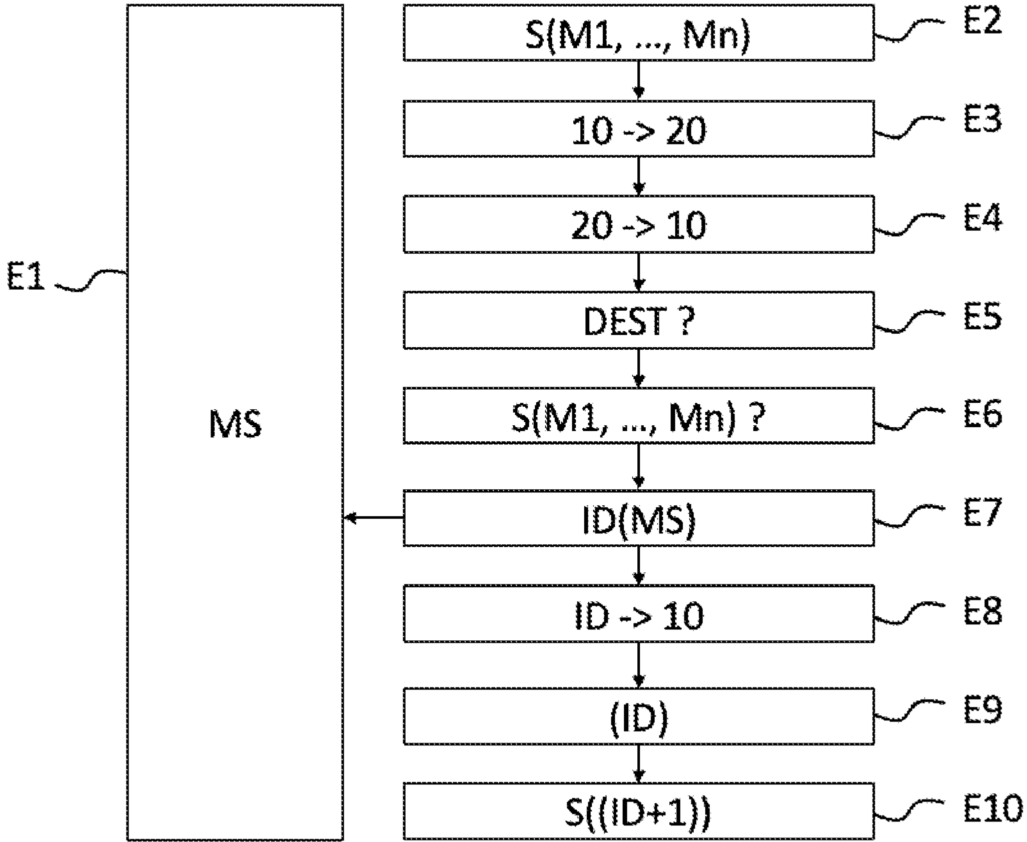
FIG. 2 schematically illustrates a method according to one or more embodiments of the invention.

An example of the method according to one or more embodiments of the invention will now be described with reference to FIG. 2.

Permanently, by way of one or more embodiments, in a step E1, each user equipment 10 of the user equipment 10 set broadcasts a status message MS indicating its presence on the communication network 20. In practice, by way of one or more embodiments, such a broadcast results in a periodic transmission of the status message MS, the content of the latter comprising at least the identifier of the user equipment 10 that transmits it and may vary from one transmission to another, for example comprising, in addition to the identifier of the user equipment 10 that transmits it, for a series S of payload messages of which it is the recipient, the last identifier of an identifier string constructed from the identifiers contained in the payload messages of the series S it has received.

When one of the pieces of user equipment 10 needs to transmit a series S of payload messages M1, . . . , Mn, for example related to an application, to one or more of the other pieces of user equipment 10 of the user equipment 10 set, or even to all the other pieces of user equipment 10 of the user equipment 10 set, said user equipment 10, referred to as "transmitter", generates the series S of payload messages M1, . . . , Mn to be sent in a step E2.

For example, by way of one or more embodiments, this step E2 comprises, if necessary, segmenting the payload set to be sent into several subsets, each subset being sent in a payload message of the series in the order of segmentation of the payload set.

Step E2 then comprises, by way of one or more embodiments, inserting each subset into a different payload message of the series, assigning an identifier to each payload message M1, . . . , Mn, and inserting the identifier of the preceding payload message M1, . . . , Mn of the series S, from the second payload message M1, . . . , Mn, and to the last of the series S.

The transmitter user equipment 10 sends each payload message M1, . . . , Mn of the series S, in turn in the order of said series S, via the communication network 20 in a step E3, by way of one or more embodiments. The payload messages M1, . . . , Mn of the series S may be sent as they are generated, one by one or the series S may first be generated and then sent in a burst, preferably in the order of the payload messages M1, . . . , Mn of the series S.

The payload messages M1, . . . , Mn sent by the transmitter user equipment 10 are received by some or all the other pieces of so-called "receiver" user equipment 10, in a step E4, by way of one or more embodiments. All or part of the payload messages M1, . . . , Mn sent by the transmitter user equipment 10 may not be received by some of the pieces of receiver user equipment 10, for example if the network has transmission problems or if the receivers are too far from the transmitter.

Upon receipt of a payload message M1, . . . , Mn by a receiver user equipment 10, in a step E5, by way of one or more embodiments, said receiver user equipment 10 analyses the payload message M1, . . . , Mn in order to determine whether said payload message M1, . . . , Mn comprises a recipient DEST identifier corresponding to its own identifier (that is, its unique identifier with which it indicates that it is present on the communication network 20 in its status messages MS).

In the absence of a recipient DEST identifier in the message received, the receiver deduces therefrom that the message received is intended for all the pieces of user equipment 10 of the user equipment 10 set.

In a step E6, by way of one or more embodiments, each receiver having determined that it is a recipient of the series of messages being transmitted, tries to reconstruct the identifier string of the payload messages M1, . . . , Mn of the series S from the identifiers ID of the payload messages M1, . . . , Mn received and the identifiers ID of preceding message contained in each payload message M2, . . . , Mn received.

In a step E7, by way of one or more embodiments, each receiver user equipment 10 inserts the last identifier ID of the identifier ID string constructed, called "last identifier", into its next status message MS and transmits said status message MS at the predefined time for its broadcast.

In a step E8, by way of one or more embodiments, the transmitter then receives the last identifier ID of the identifier ID string sent by each receiver. Thus, subject to the correct reception of the status messages sent by each of the receiver user equipment 10, the transmitter knows about the last payload message received by each of the receivers having received payload messages M1, . . . , Mn.

In a step E9, by way of one or more embodiments, the transmitter then determines the weakest identifier ID among the last identifiers ID received from the receivers.

Next, by way of one or more embodiments, when the transmitter determines that the last weakest identifier ID determined is different from the identifier ID of the last payload message M1, . . . , Mn of the series S that it has broadcast, in a step E10, said transmitter rebroadcasts the payload message(s) M1, . . . , Mn of the series S having an identifier ID following the last weakest identifier ID determined, that is, it rebroadcasts messages from the message following the message having the weakest identifier ID received by the receivers.

The above example has been described for the sake of clarity with a single transmitter, the other pieces of user equipment 10 being receivers, but it should be noted that several transmitters may send payload messages simultaneously and that one transmitter may thus also be a receiver of payload messages sent by another transmitter of the user equipment 10 set.

The at least one embodiment of the invention makes it possible to ensure that all the payload messages of a series of payload messages sent by a transmitter are actually received by the recipient(s) of said series of payload messages.

The invention claimed is:

1. A method for communicating messages between a plurality of pieces of user equipment of a user equipment set, via a communication network, said method comprising:

broadcasting by each user equipment of the plurality of pieces of user equipment of the user equipment set, a status message indicating a presence of said each user equipment on the communication network, broadcasting, by one of the plurality of pieces of user equipment of the user equipment set, a series of payload messages to at least one of other pieces of user equipment of the plurality of pieces of user equipment of the user equipment set, wherein said one of the plurality of pieces of user equipment of the user equipment set comprises a transmitter, wherein each payload message of said series of payload messages comprises an identifier of said each payload message and an identifier of a preceding payload message of the series of payload messages, and wherein the series of payload messages are ordered in based on their identifiers which thus form an identifier string, receiving, by the other pieces of user equipment, at least one payload message of the series of payload messages broadcast by the transmitter, wherein said other pieces of user equipment comprise a receiver, determining, by each receiver of said other pieces of user equipment, from the at least one payload message that is received, its status of recipient or not of the series of payload messages that are broadcasted, for said each receiver having determined a status of recipient of the series of payload messages that are broadcasted, constructing, by said each receiver, at least a part of the identifier string of the series of payload messages that are received from their identifiers of payload message and identifiers of preceding payload message contained in each payload message of said series of payload messages that is received, inserting, by said each receiver, into its next status message to be broadcast, a last identifier of the identifier string constructed by said each receiver, receiving, by the transmitter, the last identifier that is received from said each receiver, determining a last weakest identifier among all of the last identifier received from said each receiver, and, when the transmitter of the series of payload messages determines that the last weakest identifier that is determined is different from the identifier of a last payload message of the series of payload messages, rebroadcasting by said transmitter at least one payload message of the series of payload messages having an identifier following the last weakest identifier that is determined in the identifier string.

2. The method according to claim 1, wherein said each payload message of the series of payload messages comprises the identifier of one or more recipients.

3. The method according to claim 1, further comprising, wherein a size of a payload set configured to be inserted into a payload message of the series of payload messages being greater than a maximum size of a payload field of said payload message, a step of segmenting the payload set in order to distribute a payload of said payload set into said series of payload messages whose identifiers are ranked in ascending order to allow the receiver to fully reconstruct said series of payload messages.

4. The method according to claim 1, wherein the identifiers of consecutive payload messages of said series of payload messages are consecutive.

5. A non-transitory computer program product wherein a set of program code instructions which, when run by one or more processors, configure the one or more processors to implement a method for communicating messages between a plurality of pieces of user equipment of a user equipment set, via a communication network, said method comprising:

broadcasting by each user equipment of the plurality of pieces of user equipment of the user equipment set, a status message indicating a presence of said each user equipment on the communication network, broadcasting, by one of the plurality of pieces of user equipment of the user equipment set, a series of payload messages to at least one of other pieces of user equipment of the plurality of pieces of user equipment of the user equipment set, wherein said one of the plurality of pieces of user equipment of the user equipment set comprises a transmitter, wherein each payload message of said series of payload messages comprises an identifier of said each payload message and an identifier of a preceding payload message of the series of payload messages, and wherein the series of payload messages are ordered in based on their identifiers which thus form an identifier string, receiving, by the other pieces of user equipment, at least one payload message of the series of payload messages broadcast by the transmitter, wherein said other pieces of user equipment comprise a receiver, determining, by each receiver of said other pieces of user equipment, from the at least one payload message that is received, its status of recipient or not of the series of payload messages that are broadcasted, for said each receiver having determined a status of recipient of the series of payload messages that are broadcasted, constructing, by said each receiver, at least a part of the identifier string of the series of payload messages that are received from their identifiers of payload message and identifiers of preceding payload message contained in each payload message of said series of payload messages that is received, inserting, by said each receiver, into its next status message to be broadcast, a last identifier of the identifier string constructed by said each receiver, receiving, by the transmitter, the last identifier that is received from said each receiver, determining a last weakest identifier among all of the last identifier received from said each receiver, and, when the transmitter of the series of payload messages determines that the last weakest identifier that is determined is different from the identifier of a last payload message of the series of payload messages, rebroadcasting by said transmitter at least one payload message of the series of payload messages having an identifier following the last weakest identifier that is determined in the identifier string.

6. A user equipment that communicates messages between a plurality of pieces of user equipment of a user equipment set via a communication network, said user equipment comprising:

a transmitter, wherein said transmitter is configured to broadcast a series of payload messages to at least one other piece of user equipment of other pieces of user equipment of the plurality of pieces of user equipment of the user equipment set, wherein each payload message of said series of payload messages comprises an identifier of said each payload message and an identifier of a preceding payload message of the series of payload messages, wherein the series of payload messages are ordered in the order of their identifiers, which thus form an identifier string, receive a last identifier that is sent by each receiver of said other pieces of user equipment, determine a last weakest identifier among all of the last identifier that is received from all of the other pieces of user equipment, when the user equipment determines that the last weakest identifier that is determined is different from the identifier of a last payload message of the series of payload messages, rebroadcast at least one payload message of the series of payload messages having an identifier following the last weakest identifier determined in the identifier string.

7. A user equipment according to claim 6, wherein said transmitter is further configured to insert the identifier of one or more recipients into said each payload message of the series of payload messages.

8. The user equipment according to claim 6, wherein said transmitter is further configured to, when a size of a payload set configured to be inserted into a payload message is greater than a maximum size of a payload field of said payload message, segment the payload set in order to distribute payload into said series of payload messages whose identifiers are ranked in ascending order in order to allow the receiver to fully reconstruct said series of payload messages.

9. The user equipment according to claim 6, wherein said transmitter is further configured to insert consecutive identifiers into the consecutive messages of a same series.

10. The user equipment according to claim 6, wherein said user equipment further comprises a receiver, and wherein said receiver is configured to receive at least one payload message of said series of payload messages that are broadcasted by said transmitter, determine, from said at least one payload message that is received, its status of recipient or not of said series of payload messages that are broadcasted, when said user equipment has determined said status of recipient of the series of payload messages that are broadcasted, construct the identifier string of at least a part of the series of payload messages of consecutive identifiers received from their identifiers of a payload message and identifiers of a preceding payload message contained in said each payload message of said at least one payload message that is received, insert into its next status message to be broadcast the identifier of the last payload message that is received.

11. The user equipment according to claim 6, wherein said user equipment is configured to broadcast a status message indicating a presence of said user equipment on the communication network.

12. The user equipment according to claim 6, further comprising said communication network configured to enable communication between said plurality of pieces of user equipment.

* * * * *